United States Patent

[11] 3,600,697

[72] Inventor Edward S. Larson
Santa Clara, Calif.
[21] Appl. No. 875,225
[22] Filed Nov. 10, 1969
[45] Patented Aug. 17, 1971
[73] Assignee Thomas J. Grogan
San Jose, Calif.
a part interest

[54] ELECTRONIC COMPRESSOR NETWORK
16 Claims, 9 Drawing Figs.

[52] U.S. Cl. .......... 330/24, 330/29, 330/30, 330/124
[51] Int. Cl. .......... H03f 3/04
[50] Field of Search .......... 330/16, 19, 24, 29, 145; 333/14

[56] References Cited

UNITED STATES PATENTS

| | | | |
|---|---|---|---|
| 3,189,841 | 6/1965 | Druz .......... | 330/29 |
| 3,441,748 | 4/1969 | Werner .......... | 330/145 X |
| 3,449,684 | 6/1969 | Kagan .......... | 330/145 X |

*Primary Examiner*—Roy Lake
*Assistant Examiner*—Lawrence J. Dahl
*Attorneys*—Jack M. Wiseman and Thomas E. Schatzel

ABSTRACT: An electronic compressor network for preserving the fidelity of amplitude modulated alternating current signals. Means are provided which are responsive to the amplitude level of an alternating current input signal. The alternating current input signal is also received at a first electron conducting device within a compressor circuit in which the electron conducting device resistance varies in response to the amplitude of the alternating current signal. A direct current control signal is simultaneously applied at a control element of the electronic conducting device. The magnitude of the impedance of the electron conducting device varies inversely relative to the magnitude of the input signal. The output of the first electron conducting device is fed to the input of a second electron conducting device having impedance operating characteristics complementary to those of the first electron conducting device.

INVENTOR.
EDWARD S. LARSON

BY Jack M. Wiseman
Thomas Schatzel
ATTORNEYS

INVENTOR.
EDWARD S. LARSON

BY Jack M. Wiseman
Thomas [signature]
ATTORNEYS

ELECTRONIC COMPRESSOR NETWORK

BACKGROUND OF THE INVENTION

The present invention relates to amplifier circuits and more particularly to an improved circuit network which serves as a volume compression circuit or which may be modified to serve as a volume expander network. The improved circuit network preserves the fidelity of amplitude modulated alternating current input signals. A volume compressor is generally recognized as a device for reducing amplification when the signal being amplified is large and increasing the amplification when the signal is small. Compressors are commonly used to reduce the volume range in sound systems. A volume expander is generally recognized as a device for increasing amplification when the average power level of the signal is high and to reduce the amplification when the average power level of the signal is small so as to cause the loud passages to be still louder and the weak passages to have their weakness accentuated. Expanders may be used to counteract the compression of volume range frequently necessary in sound recording et cetera, and also to introduce added esthetic effects.

There are presently available in the prior art compression circuits and expansion circuits. However, with increasingly sophisticated electronic equipment it is desirable to provide improved electronic devices for preserving fidelity of input signals and to provide more noise free signals. At the same time, it is desirable to provide improved devices which are economical.

SUMMARY OF THE PRESENT INVENTION

In the present invention, an improved compression network is provided, which network is of relatively noncomplex structure and economical to manufacture. The network has been found to provide over a wide range, fast response while introducing negligible harmonic distortion in the compressing process.

In an exemplary embodiment, the compression network provides compression for input amplitude modulated signals. For example, an input audio signal may be received and fed through a direct current control circuit. The control circuit extends to a control element of an electron conducting device, e.g. the base of a transistor, of a first stage within a compression circuit and is adapted to provide a direct current control signal responsive to the input signal. At the same time, the electron conducting device receives the input signal at another element, e.g. the collector of the transistor such that the impedance across the collector-emitter network of the transistor varies nonlinearly in response to the input signal. The output of the first stage, e.g. on the collector reflects the variations of the control signal. The output of the first stage extends to the control electrode of an electron conducting device of a second stage, e.g. base electrode of a second transistor, within the compression circuit such that the resistance of the second stage varies nonlinearly in response to the output signal of the first stage. The transistors of the first and second stages are selected such that the resistance characteristics responsive to input signals are complementary to one another.

DESCRIPTION OF THE PREFERRED EMBODIMENT

Figure 1:
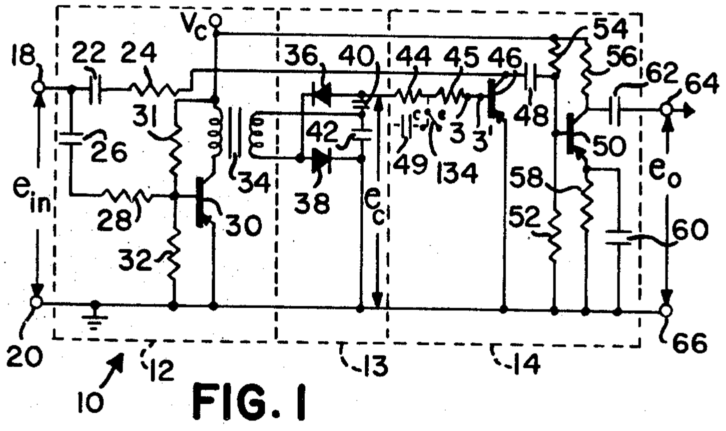
FIG. 1 is a circuit diagram of a compressor circuit incorporating the teachings of the present invention.

FIG. 1 illustrates a compressor network referred to by the general reference character 10 and incorporating the teachings of the present invention. The network 10 includes three stages designated within the broken line diagrams 12, 13 and 14. The stage 12 serves as an alternating current amplifier and includes an input terminal means in the form of a pair of terminals 18 and 20 to receive an input information signal such as an audio amplitude modulated signal $e_{in}$ which, e.g. may be the output from a tuner, phonograph preamplifier or tape recorder. The input terminal 18 extends to a first RC coupling network including a capacitance 22 and a resistance 24. The terminal 18 also extends to a second RC coupling network including a capacitance 26 and a resistance 28 to the base control electrode of a PNP transistor 30. Base bias is derived through a pair of resistors 31 and 32 with the resistor 31 extending to a supply source $V_c$ and the resistor 32 to the ground potential. The collector of the transistor 30 engages the primary winding of a transformer 34 with the other end of the primary winding extending to the source $V_c$. The emitter of the transistor 30 extends to ground potential. The secondary winding of the transformer 34 extends to stage 13 referred to as the direct current control circuit. The stage 13 serves as a full-wave voltage rectifier-doubler to provide a negative direct current control signal $e_c$ of a magnitude responsive to the input information signal $e_{in}$. The stage 13 includes a pair of diodes 36 and 38 and a pair of capacitors 40 and 42. One side of the secondary winding of the transformer 34 is tied intermediate the capacitors 40 and 42 and the other side to the anode of the diode 38 and cathode of the diode 36. The cathode of the diode 38 is common to the capacitor 42 and to ground potential while the capacitor 40 is common to the anode of the diode 36. Accordingly, a full-wave direct current control signal $e_c$ appears across the stage 13.

The junction of the diode 36 and the capacitor 40 extends to a pair of input resistors 44 and 45 of the stage 14. The stage 14 serves as the compressor circuit of the network 10. Stage 14 includes a first electron conducting device in the form of a PNP transistor 46. A control element of the electron conducting device 46, in this instance, the base electrode is joined to the resistor 45 to receive the control signal $e_c$. A second control element, in this instance, the collector electrode of the transistor 46 is common to the RC circuit of the capacitor 22 and resistor 24 and to an output coupling capacitor 48. A third control element, in this instance, the emitter extends to ground reference level. A capacitor 49 may be joined in parallel with the resistor 44 to make compression response faster.

The coupling capacitor 48 extends to a second electron conducting device in the form of a PNP transistor 50 having a control element in the form of a base electrode. The base of the transistor 50 joins the coupling capacitor 48 to receive the output signal of the transistor 46. Bias to the transistor 50 is realized through the voltage divider network comprised of a resistor 52 extending to ground reference potential and a resistor 54 extending to the supply source $V_c$. The collector of the transistor 50 extends through a resistance 56 to the source $V_c$ and the emitter extends to ground reference potential level through a parallel RC network comprised of a resistance 58 and a capacitance 60. A coupling capacitor 62 extends from the collector to an output terminal means comprising a pair of output terminals 64 and 66 across which the compressed output signal $e_o$ appears.

In the operation of the compressor network 10 and audio information input signal $e_{in}$ is received by the stage 12. It has been found preferable that the signal be of the order of zero decibels (0.78 volt). The signal $e_{in}$ may originate with an audio system such as a tuner, a phonograph preamplifier, or tape recorder. The stage 12 amplifies the $e_{in}$ signal such that an amplified signal is produced across the secondary of the transformer 34. The signal is rectified and the voltage level doubled in the DC control stage 13 so as to in effect provide a full-wave rectified and filtered control signal $e_c$ at the base of the transistor 46 of the stage 14 which signal $e_c$ is responsive to the input information signal $e_{in}$. The voltage doubler circuit 13 has been found to provide a relatively high voltage with low ripple. However, half-wave filter networks may also be used. The amplitude of the rectified control signal $e_c$ varies in response to variation in the input signal $e_{in}$. The combination of the resistors 44 and 45 with the capacitor 49 is a controlling factor in the response time of compression. The values of the capacitor 49 and resistors 44 and 45 may be selected to provide a time constant compatible for a rapid response time to minimize overshoot of the voltage at the base of the transistor 46. The resistor 24 serves as increasing the input resistance to the signal $e_{in}$ and as a voltage divider with the collector-to-emitter resistance of the transistor 46 for the input signal $e_{in}$. The transistor 46 serves as an electron conducting device having impedance characteristics varying in response to the information signal $e_{in}$. The collector-to-emitter resistance of the transistor 46 is nonlinear varying with the $e_{in}$ signal. The range of resistance values is also dependent upon the base current and beta characteristic of the transistor such that the resistance is further dependent upon the control signal $e_c$. Thus, as the input signal $e_{in}$ increases, the negative voltage $e_c$ on the base electrode of the transistor 46 increases and the collector-to-emitter resistance decreases. This action is similar to the characteristics of a semiconductor diode in forward direction. The nonlinearity characteristics of the collector-to-emitter resistance of the transistor 46 is similar to that of the forward resistance of a diode. The transistor 50 serves as an electron conducting device having impedance characteristics varying in response to the signal from the transistor 46. In response to the conduction of the transistor 46, the base-to-emitter resistance of the transistor 50 varies nonlinearly similar to that of the collector-to-emitter resistance of the transistor 46. Accordingly, the distortion introduced by the transistor stage 46 is corrected by the transistor stage 50. To a given signal, the nonlinearity characteristics of the transistors 46 and 50 are complementary. For example, in embodiments constructed and tested and of proven performance, a 2N1378 type transistor was utilized for the electron conducting device 46 and a 2N323 was utilized for the electron conducting device 50. The compressed output signal $e_o$ may then be delivered to a power amplifier and speaker. In application, it has been found that the transistors 46 and 50 may be either silicon or germanium but preferably both are of the same type so that variations in ambient temperature have little effect upon circuit operation.

Figure 2:
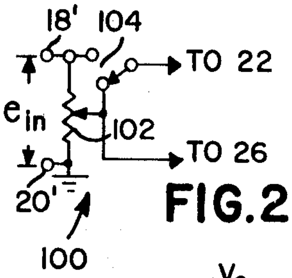
FIG. 2 illustrates an optional circuit to be incorporated at the input of the circuit of FIG. 1.

FIG. 2 illustrates a variable attenuator circuit 100 which may be added to the network 10 in the event the input signal $e_{in}$ is relatively large in amplitude and fails to meet the desired condition of zero decibels (0.78 volts). The variable attenuator circuit 100 includes a variable resistance in the form of a potentiometer 102 extending across the input terminals 18′ and 20′ with the wiper arm common to the capacitor 26 and to one pole of a two-way switch 104. The armature of the switch 104 extends to the capacitor 22. This arrangement allows the $e_{in}$ signal to be received directly without attenuation or through the potentiometer depending on the position of the switch 104. The signal received may be further selected dependent upon the setting of the wiper arm of the potentiometer 102. Thus, if the input signal $e_{in}$ is of the desired zero decibel characteristic the switch 104 may be set in the upper position. If the $e_{in}$ signal exceeds the desired zero decibel level, then the switch 104 is set in the lower position and the wiper arm of the potentiometer 102 is set until the signal $e_{in}$ is attenuated to the desired value.

Figure 3:
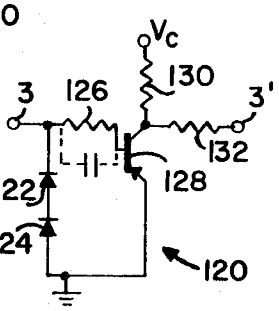
FIG. 3 is a circuit diagram of an optional network which may be inserted at the terminals 3–3′ of the circuit of FIG. 1 to modify the circuit to serve as an expansion circuit.

FIG. 3 illustrates an inverter circuit arrangement 120 which may be utilized in conjunction with the network 10 to provide an expansion network. The arrangement 120 may be inserted intermediate the terminals 3–3′ of the network 10 to convert the function to that of expansion. The circuit 120 includes a pair of diodes 122 and 124 in series and operative in the forward direction. The diodes 122 and 124 extend between ground reference level and an input resistor 126 extending to the base of a PNP transistor 128. The emitter of the transistor 128 extends to ground reference and the collector through a load resistor 130 to the supply source $V_c$ and to the base electrode of the transistor 46 through a coupling resistor 132.

The function of the circuit arrangement 120 is to reverse the polarity of the DC control voltage $e_c$ and to provide a minimum current to the base of the transistor 46 when the signal $e_{in}$ is a maximum and to provide maximum current to the base when the signal $e_{in}$ is a minimum. Selecting a resistor 132 of a large value limits the current to the base of the transistor 46. The input signal $e_{in}$ then results in generation of a DC control signal which tends to neutralize the current due to the supply voltage $V_c$ and an expander response is established. The inverting operation resulting from the action of the transistor 128 and diodes 122 and 124 aids in providing a uniform expansion such that large amplitude signals are further increased in amplitude and small amplitude signals are further decreased. It has been further found that the capacitor 49 should be effectively removed in the expand operation to avoid excessive amplification of the ripple frequency. Accordingly, a switch 134 may be incorporated as shown in series with the capacitor 49.

Figures 4, 6:
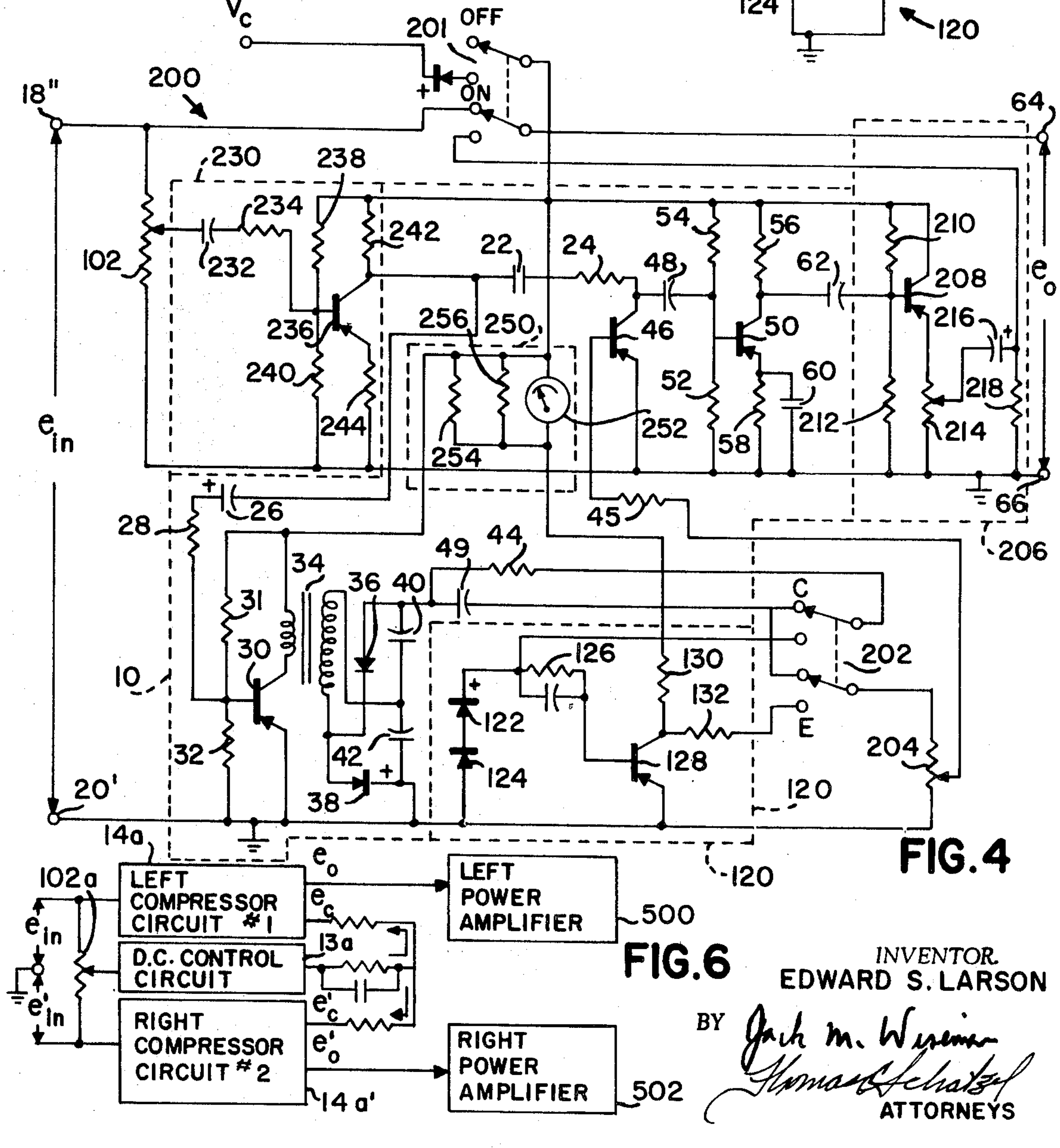
FIG. 4 illustrates a compress-expand network according to the teachings of the present invention.
FIG. 6 illustrates in block diagram form a compressor network of the present invention incorporated in a stereo system.

FIG. 4 illustrates a compressor-expander network referred to by the general reference character 200 incorporating the heretofore circuits in combination. The network 200 has been found to provide, in operation throughout the range usually found in classical music recordings, a distortion level of approximately one percent, most of which was second harmonic. All components similar to those of the circuits of FIGS. 1—3 carry the same reference numerals. The network 200 further includes a double-pole-double-throw switch 201 to permit selection of feeding the input signal $e_{in}$ straight through or turning power on and effectively inserting compression or expansion functions. A double-pole-double-throw switch 202 is further incorporated to permit selection of either compression (C) or expansion (E) operation. Also, a continuously variable resistance in the form of a potentiometer 204 is included to provide control of the expansion and compression levels from zero to maximum.

The network 200 further includes an emitter follower stage as illustrated within the broken line diagram 206 to reduce the output impedance Zo of the network. The stage 206 includes a PNP transistor 208, the base of which is tied to a biasing voltage divider arrangement including a pair of resistors 210 and 212. The resistor 210 is common to the collector and the resistor 212 extends to ground reference potential. A volume control in the form of a potentiometer 214 is joined to the emitter with the wiper arm extending through a capacitor 216 to a load resistor 218 which extends across the output terminals 64′ and 66′ when the switch 201 is in the ON position.

An amplifier stage illustrated within the broken line block diagram 230 is also included in combination with the potentiometer 102 at the front end of the network 10. This permits the level of the input signal $e_{in}$ to be adjusted to a desired select value. The stage 230 includes the potentiometer 102 with the wiper arm tied to an RC input comprising a capacitor 232 and a resistor 234 tied to the base of a PNP transistor 236. Bias to the base of the transistor 236 is realized by a resistance 238 extending to the source $V_c$ and a resistance 240 extending to the ground reference level. The collector extends to $V_c$ through a load resistance 242 and to the coupling capacitor 22. The emitter extends to the ground reference level through a resistance 244. Accordingly, assuming it is desirable to attain a signal of zero decibel at the input of the stage 10, the potentiometer 102 may be set according to the level of the signal $e_{in}$ at the terminals 18'' and 20'' and the amplification factor of the stage 230. Also, included is a meter network 250 to select optimum level of the settings of the potentiometer 102. The meter network 250 includes a graduated meter 252 in parallel with a pair of calibrating resistors 254 and 256. To utilize the meter network 250, the switch 202 is set for Expand and the input potentiometer 102 varied until the meter 252 reading corresponds to the $V_c$ potential at the loudest passages only. This indicates that $e_{in}$ is at or near the optimum zero decibel level. Then, the switch 202 may be retained in the expand position or switched over for compress operation depending on the desired operation with no change in setting of potentiometer 102.

Figure 5:
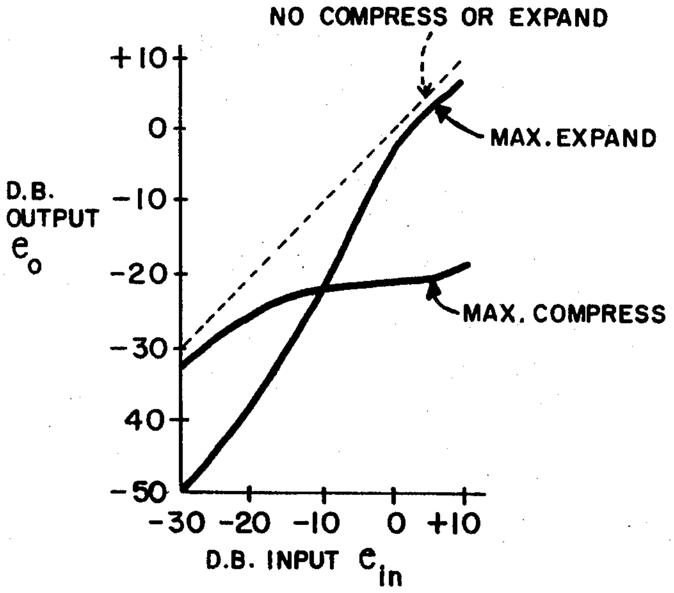
FIG. 5 is a graphic illustration of the output versus input of the network of FIG. 4.

FIG. 5 graphically illustrates operation of the network 200. The graph illustrates the output signal $e_o$ versus the information input signal $e_{in}$. The response is illustrated for when there is no compression or expansion operation, compression operation only and expansion operation only.

FIG. 6 illustrates in block diagram form a stereo sound system incorporating networks of the present invention. The left and right channels incorporate a compression circuit 14*a* and 14*a'*, respectively, similar to the compression circuit 14 with a common DC control circuit 13*a* similar to the circuit 13. The input signals designated $e_{in}$ and $e'_{in}$ are received across a potentiometer 102*a* and may originate with the output of a radio broadcast tuner, tape recorder, etc. The control circuit 13*a* provides the negative control signal $e_c$ to each of the left compressor 14*a* and the right compressor 14*a'*. The output signals designated $e_o$ and $e_o'$ from the compressors are then delivered to a left power amplifier 500 and to a right power amplifier 502, respectively. If expansion is also desired, the circuit 120 or its equivalent may be added to each of the compressor circuits 14*a* and 14*a'*.

Figures 7, 8:
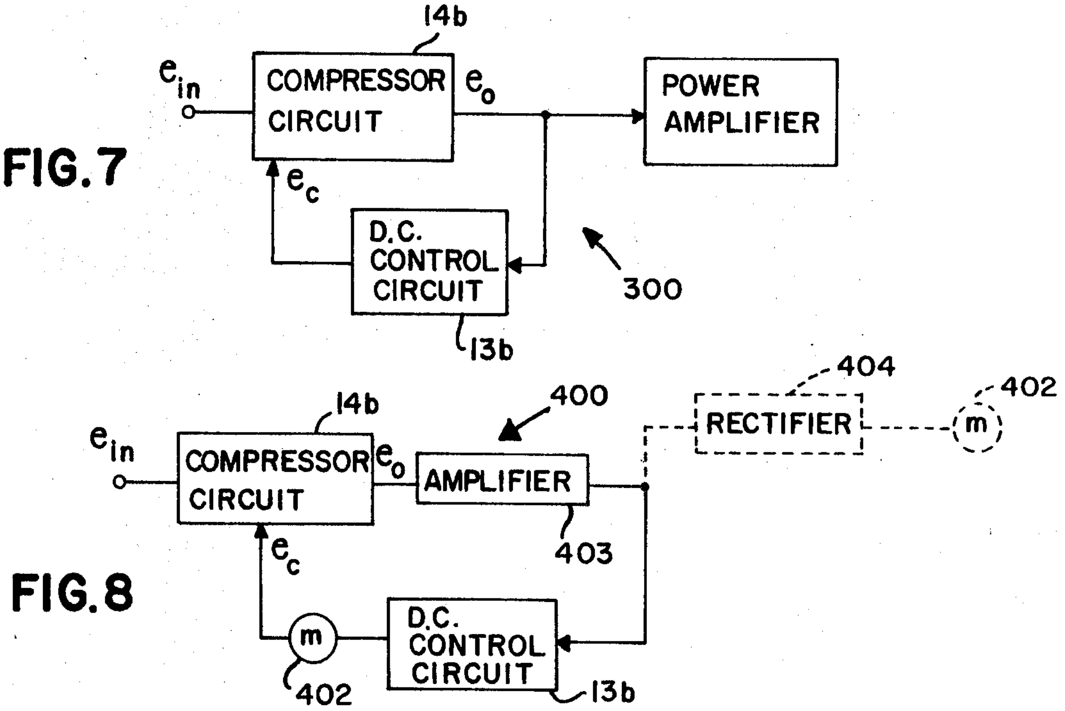
FIG. 7 illustrates in block diagram form a compressor network of the present invention where the control signal is derived in a feedback path.
FIG. 8 illustrates in block diagram form a compressor network of the present invention with a decibel meter incorporated therein.

FIG. 7 illustrates in block diagram an alternative embodiment referred to by the general reference character 300 wherein the direct current control signal $e_c$ originates in a feedback path from the output of the compressor circuit 14*b*. The output signal $e_o$ is fed to a direct current control circuit 13*b* to derive the direct current control signal $e_c$. In the network 300, the DC control signal $e_c$ varies in amplitude responsive to amplitude variations in the output signal $e_o$ which is responsive to the input signal $e_{in}$. It has been found that an arrangement according to FIG. 6 provides a smaller rate of compression than arrangements according to FIG. 1 but that compression is more uniform over a greater range of input intensities. In fact, the range is sufficient so that the network may be used as a wide range DB (decibel) meter. For example, FIG. 8 illustrates a network 400 including a meter 402 inserted in series with the control circuit 13*b* and compressor circuit 14*b*. The meter 402 may have a wide range without scale change if the $e_o$ signal to the input of the circuit 13*b* is amplified to sufficient amplitude by an amplifier 403. Also, as illustrated by the broken lines in FIG. 8, the meter 402, rather than inserted intermediate the circuit 13*b* and 14*b* may be inserted at the output of the amplifier 403 by incorporating a rectifier 404 in series with the meter. In such embodiments, it may also be desirable in some applications to obtain a decibel meter responsive to all audio frequency signals to incorporate frequency emphasis and/or frequency deemphasis networks intermediate the input terminals and the meter.

Figure 9:
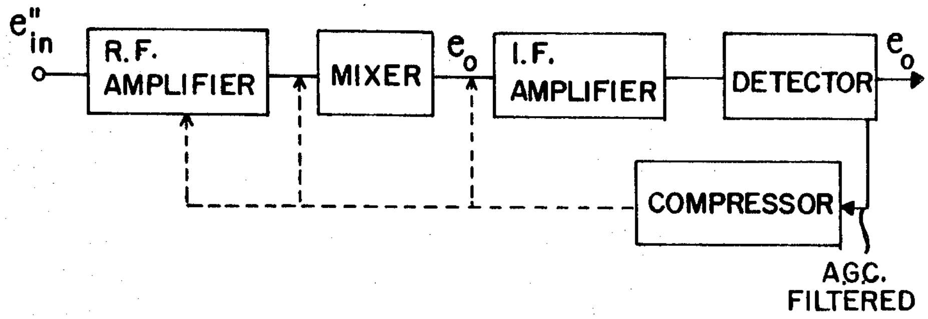
FIG. 9 illustrates in block diagram form a compressor network of the present invention incorporated in a radio frequency circuit arrangement.

The compressor network 10 is further adaptable to radio frequency circuits such as those used in AM or FM broadcast receivers to give wide range automatic gain control (AGC). Preferably, in such applications, high frequency components such as the transistors 46 and 50 having low interelectrode capacitance are used. The illustrated embodiment of FIG. 9 incorporates a compressor circuit 14*d* incorporated in combination with a superheterdyne receiver arrangement. The direct current control signal for a compressor circuit 14*d* may be derived from the automatic gain control circuitry which generates a direct current signal responsive to the information signal. The compressed signal may then be fed back to one of the intermediate frequency (IF) amplifiers, the radio frequency (RF) amplifier or mixer stages. The detector stage filters out the radio frequency and intermediate frequency components and generates direct current control signal commonly used for automatic gain control. Obviously, if it is desired to include expansion operation the circuit 120 or its equivalent may be included.

I claim

1. A compressor network comprising, in combination,
first means for transmitting an input information signal;
means for generating a direct current control signal in response to the input information;
a compressor circuit including a first electron conducting device having impedance characteristics variably responsive to electrical signal, the first electron conducting device having a first control electrode to receive the control signal, a second electrode to receive the input information signal from said first means and a third electrode with the impedance between the second electrode and the third electrode variably responsive to the input information signal, a second electron conducting device with a first control electrode and a second control electrode, and means coupling the first electrode of the second electron conducting device to said second and third electrodes of said first electron conducting device to receive a signal from the output of the first electron conducting device, the second electron conducting device having impedance characteristics between its first and second electrodes variably responsive to the signal on this first control electrode,
the first electron conducting device and the second electron conducting device have complementary nonlinear impedance characteristics; and
output means connected to said second electron conducting device to receive a compressed signal therefrom.

2. The compressor network of claim 1 further including an inverter network intermediate the means for generating the control signal and the compressor circuit, the inverter network adapted to invert the polarity of the control signal.

3. The compressor network of claim 1 in which
the first and second electron conducting devices are in the form of semiconductor devices.

4. The compressor network of claim 1 in which
the first electron conducting device is in the form of a transistor and the second electron conducting device is in the form of a transistor.

5. The compressor network of claim 3 in which
the first and second transistors are made from the same semiconductor material.

6. The compressor network of claim 4 in which
the first and second transistors are made from a silicon material.

7. The compressor network of claim 4 in which
the first and second transistors are made from a germanium material.

8. The compressor network of claim 1 in which
the second electron conducting device carries at least three separate electrodes with one electrode receiving the output signal of the first electron conducting device, the impedance of the second electron conducting device between the receiving electrode and an output electrode being variably responsive to the received signal.

9. A compressor network comprising, in combination:
first means for transmitting an input information signal;
means for generating a direct current control signal in response to the input information signal;
a compressor circuit including a first transistor having a base electrode, a collector electrode and an emitter electrode, the base electrode being connected to the means for generating said control signal to receive the control signal, another of said electrodes connected to said first means to receive the information signal such that the resistance between said collector and emitter electrodes varies in response to the information signal; a second transistor having a base electrode, a collector electrode and an emitter electrode, and means coupling the base electrode of said second transistor to said collector and emitter electrodes of said first transistor to receive the output signal of the first transistor with the resistance between the base electrode of said second transistor and one of the other electrodes of said second transistor varying in response to the signal applied to the base electrode of said second transistor and complementary to the resistance of the first transistor between said collector and emitter electrodes of said first transistor; and output means connected to said second transistor to receive a compressed signal from said second transistor.

10. The compressor network of claim 9 further including an inverter network intermediate the means for generating said control signal and the first transistor, the inverter network adapted to invert the polarity of said control signal.

11. The compressor network of claim 9 in which the means for generating a control signal include rectifier means extending to the input terminal means, the rectifier means providing a direct current control signal of an amplitude responsive to the amplitude of the information signal.

12. The compressor network of claim 11 including a resistance-capacitance network extending intermediate the rectifier means and the base electrode of said first transistor.

13. The compressor network of claim 12 further including means for controlling the amplitude of the input information signal to the rectifier means to a desired select value.

14. The compressor network of claim 13 further including an input amplifier stage extending to the input terminal means and adapted to receive the input information signal, the input amplifier providing a signal responsive to the rectifier means of a desired select value.

15. The compressor network of claim 14 further including an emitter follower stage extending intermediate the second transistor and the output terminal means.

16. The compressor network of claim 11 further including inverter means intermediate the rectifier means and said first transistor of the compressor circuit, the inverter means adapted to receive the control signal at the output of the rectifier means and invert said signal and provide the inverted signal at the base electrode of said first transistor.